(12) United States Patent
Nelson (10) Patent No.: US 7,082,228 B2
(45) Date of Patent: Jul. 25, 2006

(54) MULTIPLE ORDER PMD COMPENSATOR FOR OPTICAL FIBER TRANSMISSION SYSTEM

(75) Inventor: Lynn E. Nelson, Monmouth Beach, NJ (US)

(73) Assignee: Fitel USA Corp., Norcross, GA (US)

( * ) Notice: Subject to any disclaimer, the term of this patent is extended or adjusted under 35 U.S.C. 154(b) by 240 days.

(21) Appl. No.: 10/442,609

(22) Filed: May 21, 2003

(65) Prior Publication Data

US 2004/0234186 A1   Nov. 25, 2004

(51) Int. Cl.
*G02B 6/27*   (2006.01)

(52) U.S. Cl. ............................................. 385/11

(58) Field of Classification Search ........... 385/11, 385/27; 398/152
See application file for complete search history.

(56) References Cited

U.S. PATENT DOCUMENTS

| | | | |
|---|---|---|---|
| 6,538,787 B1 * | 3/2003 | Moeller et al. | 398/158 |
| 6,654,103 B1 * | 11/2003 | Yu et al. | 356/73.1 |
| 6,748,142 B1 * | 6/2004 | Madsen | 385/49 |
| 6,778,782 B1 * | 8/2004 | Watley et al. | 398/147 |
| 6,829,409 B1 * | 12/2004 | Koch et al. | 385/27 |
| 6,842,283 B1 * | 1/2005 | Savory et al. | 359/499 |

FOREIGN PATENT DOCUMENTS

WO   WO 03/030410 A2 *   4/2003   ............. 385/11

* cited by examiner

*Primary Examiner*—Akm Enayet Ullah
*Assistant Examiner*—Mike Stahl
(74) *Attorney, Agent, or Firm*—Polster, Lieder, Woodruff & Lucchesi, L.C.

(57) ABSTRACT

In accordance with the invention, an optical fiber transmission system is provided with multiple order PMD compensation to provide enhanced compensation at high bit rates and across a range of frequencies. Specifically, PMD is compensated by a concatenated series of components, each component configured to compensate for the effects of a successively higher order term of a PMD Taylor series approximation. Advantageously, each component comprises a polarization controller and a differential dispersion element of specified order. In an exemplary embodiment, the first order differential dispersion element can be a standard differential group delay (DGD) element. The element of second order can be a differential group-velocity dispersion element, and the third order element can be a differential dispersion slope element. These differential dispersion elements of various orders can be fixed or tunable elements in different embodiments.

11 Claims, 4 Drawing Sheets

DERIVATIVES OF $R_{(n)}^{\dagger}$ at $\omega_0$

DERIVATIVES →

| ROTAT. POWER | $R_{(n)}^{\dagger}$ | $R_{(n)}^{'\dagger}$ | $R_{(n)}^{''\dagger}$ | $R_{(n)}^{'''\dagger}$ | $R_{(n)}^{(4)\dagger}$ | $R_{(n)}^{(5)\dagger}$ | $R_{(n)}^{(6)\dagger}$ |
|---|---|---|---|---|---|---|---|
| $R_{(1)}$ | I | $-\vec{p}_1 x$ | $(\vec{p}_1 x)^2$ | $-(\vec{p}_1 x)^3$ | $(\vec{p}_1 x)^4$ | $-(\vec{p}_1 x)^5$ | $(\vec{p}_1 x)^6$ |
| $R_{(2)}$ | I | 0 | $-\vec{p}_2 x$ | 0 | $3(\vec{p}_2 x)^2$ | 0 | $-15(\vec{p}_2 x)^3$ |
| $R_{(3)}$ | I | 0 | 0 | $-\vec{p}_3 x$ | 0 | 0 | $10(\vec{p}_3 x)^2$ |
| $R_{(4)}$ | I | 0 | 0 | 0 | $-\vec{p}_4 x$ | 0 | 0 |
| $R_{(5)}$ | I | 0 | 0 | 0 | 0 | $-\vec{p}_5 x$ | 0 |
| $R_{(6)}$ | I | 0 | 0 | 0 | 0 | 0 | $-\vec{p}_6 x$ |

MULTIPLE ORDER PMD COMPENSATOR FOR OPTICAL FIBER TRANSMISSION SYSTEM

FIELD OF THE INVENTION

This invention relates to optical fiber transmission systems and, in particular, to a transmission system provided with a compensator to mitigate the effects of multiple orders of polarization mode dispersion.

BACKGROUND OF THE INVENTION

Optical fiber transmission systems are beginning to achieve their great potential for the rapid transmission of vast amounts of information. In essence, an optical transmission system comprises an optical signal source and an optical fiber transmission path for carrying the optical signals to a receiver for demodulating the information the signals carry. Increasingly the optical signals are wavelength division multiplexed signals (WDM or DWDM signals) comprising a plurality of distinct wavelength signal channels. In each channel information is typically transmitted as a sequence of optical pulses.

Polarization mode dispersion compensators are potentially important components of optical transmission systems. Polarization mode dispersion (PMD) occurs when different orthogonal polarization components of a signal are subject to different propagation delays. Imperfections in fibers and optical components can produce differing delays in the polarization components. These differing delays can distort the shape of transmitted signal pulses.

PMD is of increasing concern at higher bit rates, particularly at 40 Gb/s and above. Moreover, since PMD can vary with frequency, it is increasingly difficult to compensate systems that transmit optical signals over a wider range of frequencies. Accordingly there is a need for an optical fiber transmission system with improved PMD compensation.

SUMMARY OF THE INVENTION

In accordance with the invention, an optical fiber transmission system is provided with multiple order PMD compensation to provide enhanced compensation at high bit rates and across a range of frequencies. Specifically, PMD is compensated by a concatenated series of components, each component configured to compensate for the effects of a successively higher order term of a PMD Taylor series approximation. Advantageously, each component comprises a polarization controller and a differential dispersion element of specified order. In an exemplary embodiment, the first order differential dispersion element can be a standard differential group delay (DGD) element. The element of second order can be a differential group-velocity dispersion element, and the third order element can be a differential dispersion slope element. These differential dispersion elements of various orders can be fixed or tunable elements in different embodiments.

BRIEF DESCRIPTION OF THE DRAWINGS

The advantages, nature and various additional features of the invention can be more clearly understood by consideration of the illustrative embodiments now to be described in detail in connection with the accompanying drawings. In the drawings.

It is to be understood that these drawing are for the purpose of explaining the concepts of the invention and, except for the graphs, are not to scale.

DETAILED DESCRIPTION

This description is divided into two parts. Part I describes exemplary embodiments of the invention, and Part II, for those skilled in the art, describes in greater detail the theory underlying the invention and extensions based thereon.

I. Optical Transmission System with Multiple Order PMD Compensation

Figure 1:
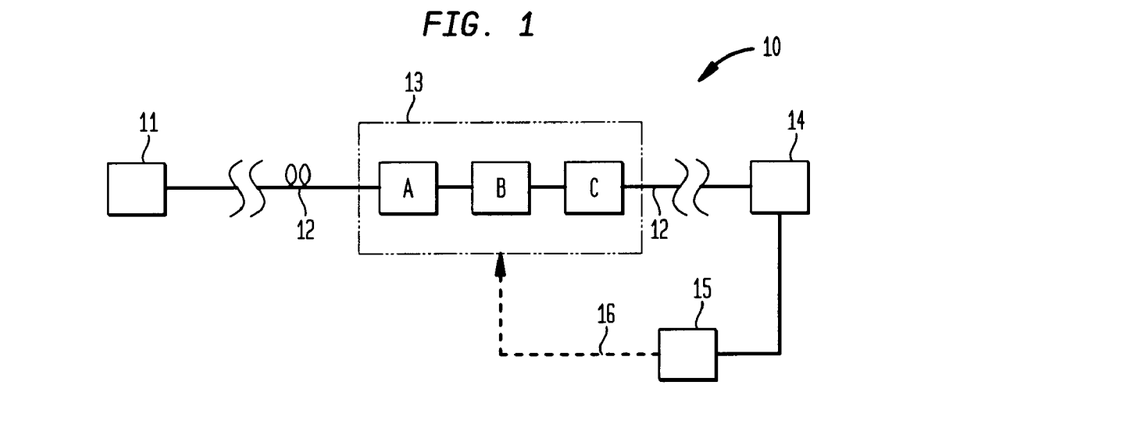
FIG. 1 schematically illustrates an optical fiber transmission system including a multiple order PMD compensator.

Referring to the drawings, FIG. 1 schematically illustrates an optical fiber transmission system 10 comprising a source 11 of information carrying pulses, a transmission path 12 comprising optical fiber for transmitting optical signals from the source 11, a multiple order PMD compensator 13, an optional optical receiver 14, and an optional monitor 15 providing a feedback signal 16 to the multiple order PMD compensator 13. It is presumed that the fiber path 12 is subject to unwanted polarization mode dispersion. The signal source 11, the fiber path 12, the receiver 14, and the monitor 15 can be conventional devices well known in the art.

The multiple order PMD compensator 13 comprises a plurality of compensating components A, B, C, . . . , each component configured to compensate a successively higher order term in a PMD Taylor series expansion with respect to wavelength. As demonstrated in Part II, the PMD as a function of angular frequency $\omega$ can be represented as a Taylor series approximation. In accordance with the invention, compensating component A compensates for the effects of the first term of the series approximation, B compensates the second term, and C compensates the third term. Additional components can be provided, if necessary, to compensate for the effects of yet higher order terms.

Figure 2:
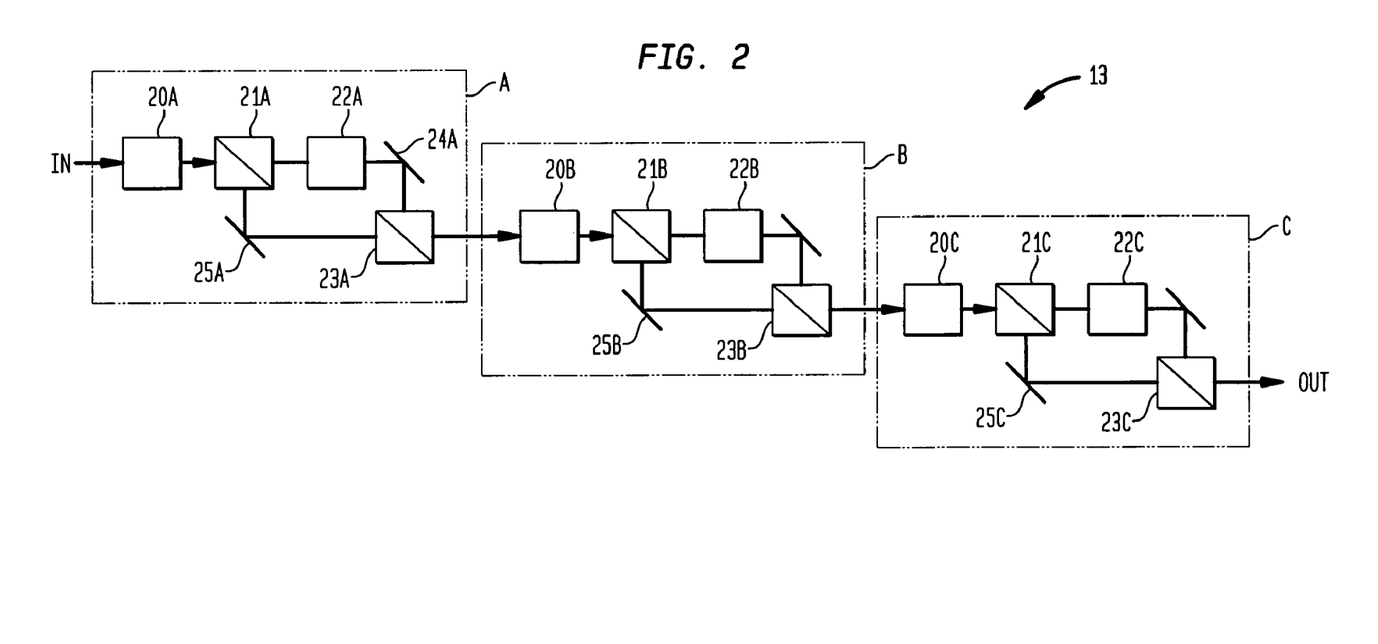
FIG. 2 shows in greater detail an exemplary multiple order compensator useful in the embodiment of FIG. 1.

FIG. 2 shows in greater detail an exemplary multiple order compensator 13 for use in the system of FIG. 1. Successive components A, B, C compensate for successively higher terms in the Taylor series approximation of the PMD vector as a function of frequency $\omega$ about some central carrier frequency $\omega_o$. In the Taylor series approximation, the PMD vector $\vec{\tau}(\omega)$ at a frequency greater by a frequency increment $\Delta\omega$ from the center frequency $\omega_o$ is approximated by the sum of a series of terms, which in the first three terms take into account respectively, 1) the PMD vector at $\omega_o$, 2) the slope of the PMD vector versus frequency at $\omega_o$, and 3) the rate at which the slope at $\omega_o$ changes with frequency. Higher order terms can also be used. Mathematically, the PMD vector at $\omega_o$ can be represented as $\vec{\tau}(\omega_o)$, the slope at $\omega_o$ as $\vec{\tau}_\omega(\omega_o)$ and the rate of slope change at $\omega_o$ as $\vec{\tau}_{\omega\omega}(\omega_o)$. $\vec{\tau}(\omega_o)$ is the PMD vector at $\omega_o$, $\vec{\tau}_\omega(\omega_o)$ is the derivative of $\vec{\tau}(\omega)$ with respect to $\omega$ evaluated at $\omega_o$, and $\vec{\tau}_{\omega\omega}(\omega_o)$ is the second derivative of $\vec{\tau}(\omega)$ with respect $\omega$ at $\omega_o$. Using this series approximation, the PMD vector at $\omega=\omega_o+\Delta\omega$ can be approximated by:

$$\vec{\tau}(\omega) = \vec{\tau}(\omega_o) + \vec{\tau}_\omega(\omega_o)\Delta\omega + \vec{\tau}_{\omega\omega}(\omega_o)\frac{\Delta\omega^2}{2} + \text{higher order terms.}$$

The invention contemplates that component A compensates for the effects of $\vec{\tau}(\omega_o)$, B compensates for the effects of $\vec{\tau}_\omega(\omega_o)\Delta\omega$, and C compensates for the effects of $$\vec{\tau}_{\omega\omega}(\omega_o)\frac{\Delta\omega^2}{2}.$$

The higher order terms are typically negligible, but they can also be compensated if desired.

In the following, the components A, B, and C will include special elements with chromatic dispersion, the difference in time delay that different frequencies (wavelengths) experience when being transmitted through an optical component or fiber. Chromatic dispersion is caused by the frequency-dependence of the refractive index of the material and the design of the waveguide. PMD is the polarization-dependence of the time delay through an optical component or fiber. (PMD may or may not be frequency-dependent). PMD and chromatic dispersion are related, in that they both reflect time delays through an optical fiber or component.

Similar to PMD, the effects of chromatic dispersion are accounted for by expanding the mode-propagation constant $\beta$ in a Taylor series about the carrier frequency $\omega_o$:

$$\beta(\omega) = \beta(\omega_o) + \beta_\omega(\omega_o)\Delta\omega + \beta_{\omega\omega}(\omega_o)\frac{\Delta\omega^2}{2} + \beta_{\omega\omega\omega}(\omega_o)\frac{\Delta\omega^3}{6} + \text{higher order terms.}$$

Here, we define $\beta_\omega$ as first order dispersion, or more precisely, "first-order phase-velocity dispersion," determining group velocity or delay, $\beta_{\omega\omega}$ as second order dispersion (or group-velocity dispersion or sometimes simply chromatic dispersion), and $\beta_{\omega\omega\omega}$ as third order dispersion (or dispersion slope). In the following, differential dispersion of a specific order will refer to the case where two orthogonal polarizations experience different dispersion of that order when propagating through an optical element.

The first component A need only be a conventional first order PMD compensator such as a differential optical delay line, where two orthogonal polarizations experience different optical delays (first order dispersion). The differential delay line can be comprised of a polarization controller 20A, a polarization beam splitter 21A, a delay element 22A, and a polarization beam combiner 23A. Mirrors 24A and 25A can direct the split beam components to their appropriate path. The polarization controller 20A rotates the polarization so that the faster-propagating polarization component from the fiber is directed to the slower path of the compensator, and the slower-propagating polarization component from the fiber goes to the faster path of the compensator. The delay element 22A is chosen to compensate polarization dispersion at the center carrier frequency $\omega_o$ or to compensate the average $\vec{\tau}(\omega)$ over the desired bandwidth (e.g. the bandwidth of the signal), as described in H. Sunnerud et al., Journal of Lightwave Technology, Vol. 20,pp. 2204–2219, 2002.The structure and operation of a conventional first order PMD compensator is described in further detail in F. Heismann et al., Proceedings of the European Conference on Optical Communication 1998, pp. 529–530.A differential optical delay line can also be constructed by placing delays in both polarization paths, as long as the optical delays are different. Alternatively, the first order PMD compensator can be comprised of a polarization controller followed by a piece of polarization maintaining (PM) fiber as described by T. Takahashi et al., Electronics Letters, Vol. 30, pp 348–349, 1994.

Figure 3:
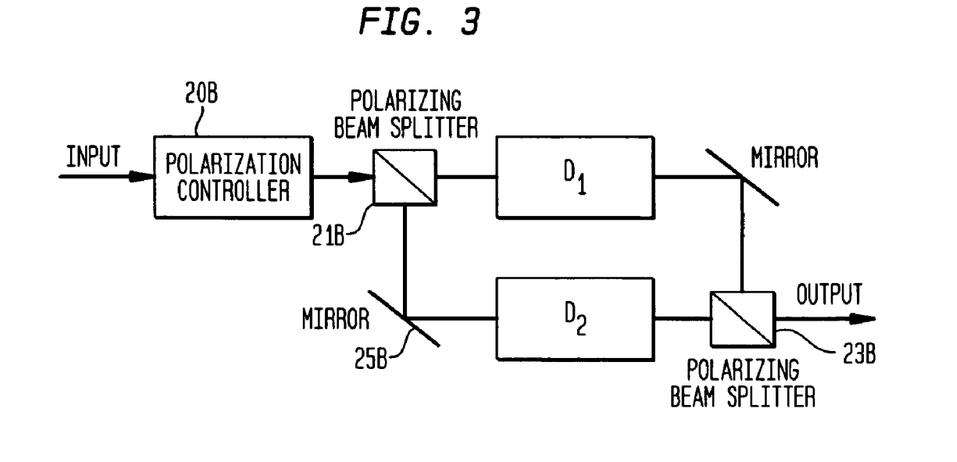
FIG. 3 shows in greater detail an alternative exemplary second-order PMD compensating element useful in the embodiment of FIG. 1.
Figure 4:
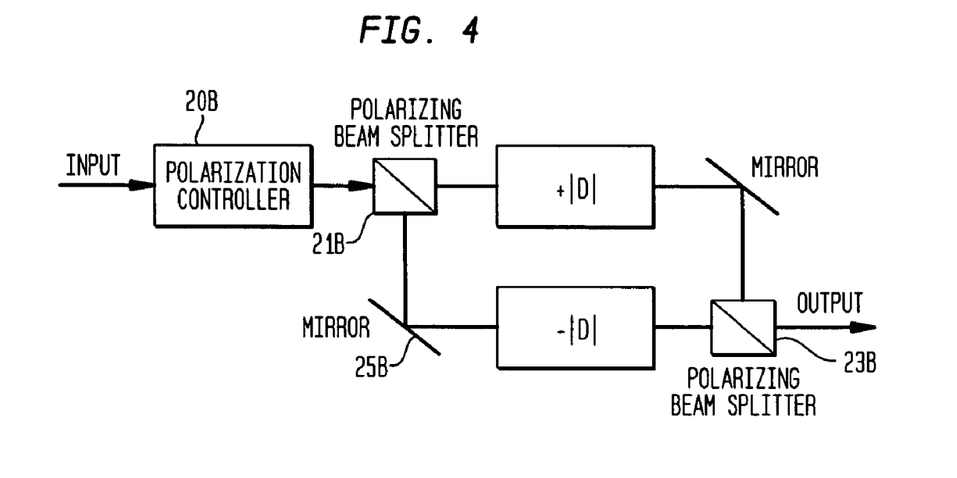
FIG. 4 shows in greater detail a second alternative exemplary second-order PMD compensating element useful in the embodiment of FIG. 1.

The second component B is a second order PMD compensator, which compensates for PMD in accordance with the slope of the PMD vector with respect to frequency, $\vec{\tau}_\omega(\omega_o)$. Component B can be similar to component A, except that it provides differential dispersion of second order, instead of differential delay (first order dispersion). The element 22B comprises one or more elements with group-velocity dispersion, such as dispersion compensating fibers or fiber Bragg gratings to supply the differential group-velocity dispersion of component B. Alternatively, differential dispersion can also be supplied by placing different amounts of group-velocity dispersion ($D_1$ and $D_2$), or group-velocity dispersion of equal magnitude but opposite sign(+|D|and −|D|), in the two polarization paths, as shown in FIG. 3 and 4, respectively. In some cases, after the PMD compensator it may be necessary to add a (polarization-independent) group-velocity dispersion compensator in order to compensate for any common (polarization-independent) group-velocity dispersion added by the PMD compensator, particularly for the implementations shown in FIG. 2 and 3. Note that an analogy to the compact implementation of differential delay for component A appears to be possible for component B. For example, this implementation would require a fiber with different group-velocity dispersion for two orthogonal polarizations.

The third component C is a third order PMD compensator which compensates PMD in accordance with the second derivative of the PMD vector versus frequency at the carrier frequency, $\vec{\tau}_{\omega\omega}(\omega_o)$. The third order compensator can be similar to component B with the element 22C comprising one or more dispersion slope elements. Similar to component B, differential dispersion slope can be supplied by placing different amounts of dispersion slope, or dispersion slope of equal magnitude but opposite sign, in the two polarization paths. And, in some cases, after the PMD compensator it may be necessary to add a (polarization-independent) dispersion-slope compensator in order to compensate for any common (polarization-independent) dispersion slope added by the PMD compensator, The multiple order compensator 13 can compensate the system of FIG. 1 with either fixed or tunable differential delay and dispersion elements. By adjusting each polarization controller for each compensation order, the launched polarization state can be forced to be aligned with the Principal State of Polarization of that order for the combined system of the fiber transmission link and PMD compensator. This approach reduces the number of control signals and does not require adjustable differential delay or dispersion.

If the differential delay and dispersion elements are tunable, further optimization of the PMD compensation can be achieved.

II. Theory and Example

Polarization mode dispersion is a transmission impairment caused by optical fiber birefringence. Slight imperfections in the fiber manufacturing process and/or stress on the fiber in the cable cause random variation of the birefringence axes along the fiber length. To first order (i.e. when the signal bandwidth is small), at the fiber output there is a differential group delay (DGD) between two orthogonal polarization states, called the principal states of polarization (PSP). At the direct-detection receiver, the intensities aligned with the two PSPs add together, resulting in pulse broadening and inter-symbol interference. PMD is commonly described by the PMD vector, $\vec{\tau} = \Delta\tau \hat{p}$, where $\Delta\tau$ is the differential group delay (DGD) and the unit vector, $\hat{p}$, points in the direction of the slower PSP. For first-order PMD, $\Delta\tau$ and $\hat{p}$ are assumed to be constant over the signal bandwidth.

In some cases, the signal bandwidth $\Delta\omega$ is larger than the bandwidth of the principal states $\Delta\omega_{PSP}$, defined as the bandwidth over which the PMD vector $\vec{\tau} = \Delta\tau \hat{p}$ is reasonably constant, i.e. $\Delta\omega > \Delta\omega_{PSP} = \pi/(4\overline{\Delta\tau})$, where $\overline{\Delta\tau}$ is the mean DGD of the fiber. We then need to consider higher-order PMD, which describes the change of the DGD with wavelength as well as the change in orientation of the PSPs with wavelength. The system impairments due to higher-order PMD are more complicated than simple pulse splitting. Using the common expansion of the PMD vector in a Taylor series, $\vec{\tau}(\omega_0 + \Delta\omega) = \vec{\tau}(\omega_0) + \vec{\tau}_\omega(\omega_0)\Delta\omega + \ldots$ about some carrier frequency $\omega_0$, the so-called second-order PMD is then described by the derivative, $$\vec{\tau}_\omega = \frac{d\vec{\tau}}{d\omega} = \Delta\tau_\omega \hat{p} + \Delta\tau \hat{p}_\omega,$$

which has two terms. In this representation, the first term, which is parallel to the first-order PMD vector, is the change of the differential group delay with wavelength and causes polarization-dependent chromatic dispersion (PCD), resulting in polarization-dependent pulse compression and broadening. It has been understood to cause a polarization-dependent change in the chromatic dispersion of the fiber. The second-term, $\Delta\tau\hat{p}_\omega$, describes how the PSPs rotate with frequency and has been termed PSP depolarization. Pulse distortions caused by PSP depolarization include overshoots and generation of satellite pulses. PSP depolarization can also have a detrimental effect on first-order PMD compensators. Studies have shown that there is a complicated interaction between dispersion, chirp, and second-order PMD. Perhaps due to the complex nature of just second-order PMD, little work has been done to understand the effects of third- and higher-order PMD, although these higher-order effects could be important for system upgrades of 10 Gb/s to 40 Gb/s over old, embedded fibers.

Although the Taylor series expansion of the PMD vector defines first- and higher-order PMD, it has not allowed a simple physical interpretation of the effects of higher-order PMD in the time domain. More precisely, the expansion has not allowed a method for constructing a (frequency-dependent) Jones matrix of the fiber for each order of higher-order PMD. H. Kogelnik, L. E. Nelson, and J. P. Gordon have recently proposed a solution to this problem, Journal of Lightwave Technology, Vol. 21, pp. 482–495, 2003. To model the fiber, we use Jones matrices of different rotational power in frequency. For a second-order model as first proposed by Eyal et al., Electronics Letters, Vol. 35, pp. 1658–1659, 1999, two sections of different rotational power are concatenated together and the Jones matrix of the concatenation is $U = U_2 U_1$. Here, $U_1$ and $U_2$ have frequency-independent rotation axes $\hat{r}_1$ and $\hat{r}_2$, respectively, and rotation angles of the form $\phi_1(\omega_0 + \Delta\omega) = k_1\Delta\omega$ and $\phi_2(\omega_0 + \Delta\omega) = k_2\Delta\omega^2/2$. The power of rotation of each section is indicated by the power of $\Delta\omega$. One can show that the PMD vector of the individual sections are $\vec{\tau}_1(\omega) = k_1\hat{r}_1$ and $\vec{\tau}_2(\omega) = k_2\hat{r}_2\Delta\omega$. And, using $U_1(\omega_0) = I$ and $U_2(\omega_0) = I$ (where I is the identity matrix) as well as the PMD vector concatenation rules, the PMD vectors at the output of the concatenation of the two sections are $\vec{\tau}(\omega_0) = k_1\hat{r}_1$ (for first-order) and $\vec{\tau}_\omega(\omega_0) = k_2\hat{r}_2$ (for second-order). Note that the third-order PMD of the $U_2 U_1$ concatenation is not zero and involves a cross-product of the first- and second-order PMD vectors.

In Kogelnik et al., this second-order model has been extended to higher-power rotations in order to model the effects of higher-order PMD. The rotation elements are similar to the $U_1$ and $U_2$ elements outlined above, except the frequency-dependent rotation angles are $\phi_n(\omega_0 + \Delta\omega) = k_n\Delta\omega^n/n!$, and each element has its own frequency-independent rotation axis $\hat{r}_n$. We can define a rotation vector $\vec{\rho}_n = k_n\hat{r}_n$, which is a Stokes vector characterizing the nth-power rotation. Then the PMD vector for each rotation section is simply:

$$\vec{\tau}_n(\omega) = \Delta\omega^{n-1}\vec{\rho}_n/(n-1)!.$$

In fact, the advantage of these higher-power rotation elements is that at the carrier frequency ($\Delta\omega=0$), they contain PMD of only one order, that is, the order of their rotation. In other words, they are elements of pure high-order PMD. For example, at the carrier frequency the $U_1$ section contains only first-order PMD, while the $U_2$ section contains only second-order PMD.

Figure 5:
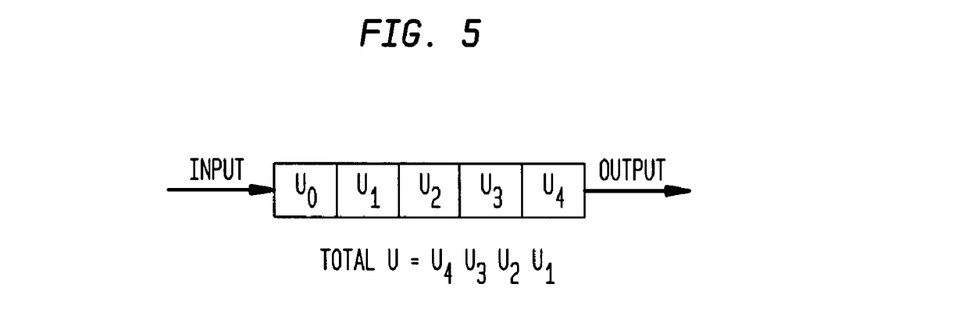
FIGS. 5–10 are schematic diagrams useful in explaining the principles and theory of the invention.

Emulator models for fiber PMD up to fourth- and six-order have recently been constructed using these higher-power rotation elements, higher-order PMD vector concatenation rules, and the Stokes vector description $\vec{\rho}_n = k_n\hat{r}_n$, as shown in Kogelnik et al. For example, FIG. 5 shows a concatenation of four elements to model up to fourth-order PMD. (Note that $U_0$ represents a frequency-independent polarization controller.)

An important aspect of modeling PMD using these higher-power rotation elements is that the elements are physically realizable. Each element is differential dispersion of a specified order. For example, $U_1$ represents differential dispersion of the first order, i.e. differential group delay (DGD). $U_2$ represents differential group-velocity dispersion, while $U_3$ represents differential dispersion slope, and so on.

The inventions herein concern the compensation of higher-order polarization mode dispersion using the higher-power rotation elements described above. Because the PMD can be modeled (or emulated) with these higher-power rotation elements, the PMD can also be compensated with these elements. The effects of PMD up to a specified order are compensated by using fixed or tunable differential dispersion elements.

Figure 6:
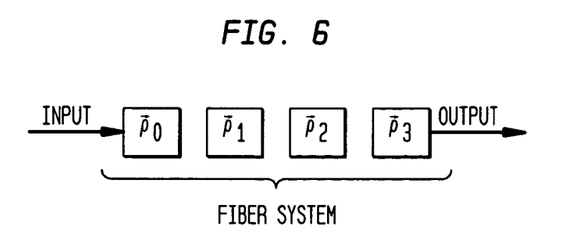
Figure 7:
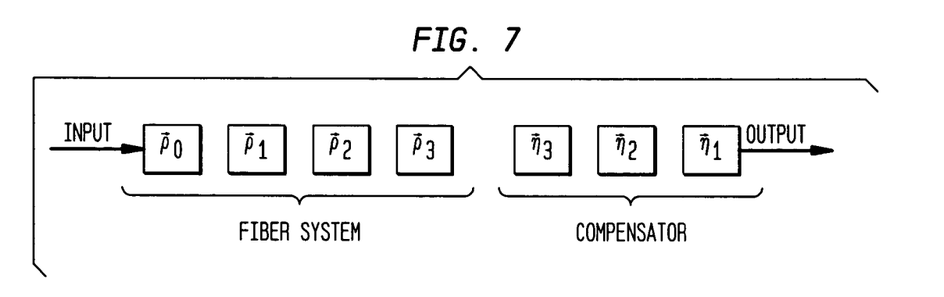

For example, if the PMD (of the fiber, system, etc.) to be compensated is known up to third order (i.e. $\vec{\tau}(\omega_0)$, $\vec{\tau}_\omega(\omega_0)$, $\vec{\tau}_{\omega\omega}(\omega_0)$ are known), the fiber can be modeled with the higher-power rotation elements shown in FIG. 6 where the subscript i represents the rotation order. It has been shown previously that $\vec{\rho}_1 = \vec{\tau}(\omega_0)$, $\vec{\rho}_2 = \vec{\tau}_\omega(\omega_0)$, and $\vec{\rho}_3 = \vec{\tau}_{\omega\omega}(\omega_0) + \vec{\tau}(\omega_0) \times \vec{\tau}_\omega(\omega_0)$, while $\vec{\rho}_0$ is a frequency-independent rotation and does not have to be compensated. We can then place a compensator consisting of higher-power rotation elements ($\vec{\eta}_1$, $\vec{\eta}_2$, $\vec{\eta}_3$) after the fiber as shown in FIG. 7.

To find the values of $\vec{\eta}_1$, $\vec{\eta}_2$, and $\vec{\eta}_3$ required to compensate the PMD of our system, we concatenate through all six sections from the compensator output back to the input of $\vec{\rho}_1$ in the diagram above (because we do not need to compensate for any frequency-independent rotation of the polarization state by the fiber, represented by $\vec{\rho}_0$), using the following equations:

$$\vec{\tau}_s = \vec{\tau}_{sn} + R_n^T \vec{\tau}_s(n-1) \qquad \text{For } 1^{st} \text{ order PMD:}$$

$$\vec{\tau}_s' = \vec{\tau}_{sn}' + R_n^T \vec{\tau}_s(n-1) + R_n^T \vec{\tau}_s'(n-1) \qquad \text{For } 2^{nd} \text{ order PMD:}$$

$$\vec{\tau}_s'' = \vec{\tau}_{sn}'' + R_n^T \vec{\tau}_s(n-1) + 2R_n^T \vec{\tau}_s'(n-1) + R_n^T \vec{\tau}_s''(n-1) \qquad \text{For } 3^{rd} \text{ order PMD:}$$

(Here primes are used to indicate differentiation instead of the subscript ω. The T superscript on the R matrices should actually be a "dagger" indicating conjugate transpose.)

Figure 8:
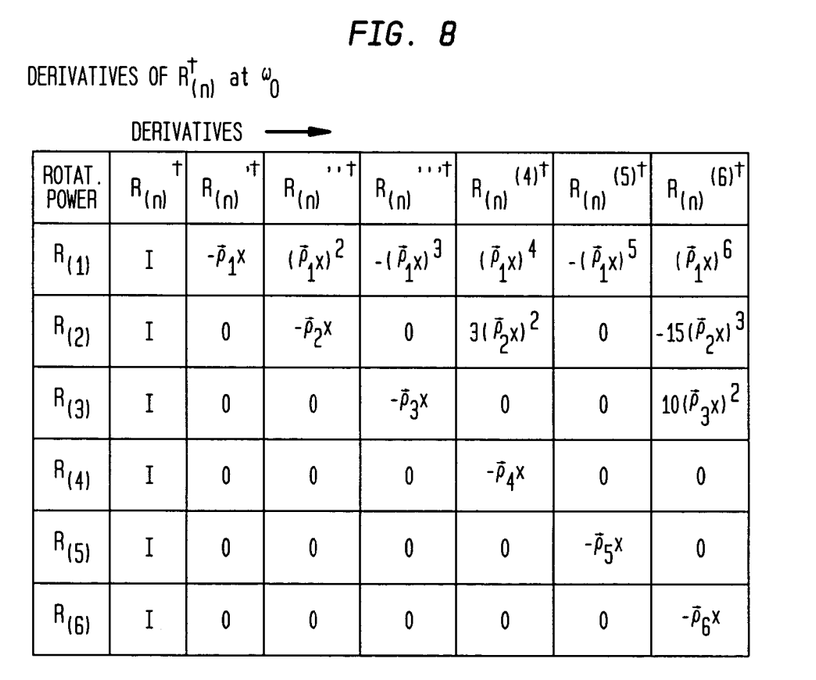

FIG. 8 is a table of the derivatives of $R^T$. Using these concatenation rules and the derivatives of $R^T$ tabulated in FIG. 8 for different rotation power at the carrier frequency $\omega_0$, we can do successive iteration towards the fiber input to sum all the PMD vectors of the different sections:

At $\vec{\eta}_1$ input:
$\vec{\tau}_s = \vec{\eta}_1$
$\vec{\tau}_s' = 0$
$\vec{\tau}_s'' = 0$ At $\vec{\eta}_2$ input:
$\vec{\tau}_s = \vec{\eta}_1$
$\vec{\tau}_s' = \vec{\eta}_2$
$\vec{\tau}_s'' = -\vec{\eta}_2 \times \vec{\eta}_1$ At $\vec{\eta}_3$ input:
$\vec{\tau}_s = \vec{\eta}_1$
$\vec{\tau}_s' = \vec{\eta}_2$
$\vec{\tau}_s'' = \vec{\eta}_3 - \vec{\eta}_2 \times \vec{\eta}_1$ At $\vec{\rho}_3$ input:
$\vec{\tau}_s = \vec{\eta}_1$
$\vec{\tau}_s' = \vec{\eta}_2$
$\vec{\tau}_s'' = \vec{\rho}_3 + \vec{\eta}_3 - \vec{\eta}_2 \times \vec{\eta}_1$ At $\vec{\rho}_2$ input:
$\vec{\tau}_s = \vec{\eta}_1$
$\vec{\tau}_s' = \vec{\rho}_2 + \vec{\eta}_2$
$\vec{\tau}_s'' = \vec{\rho}_3 + \vec{\eta}_3 - \vec{\eta}_2 \times \vec{\eta}_1 - \vec{\rho}_2 \times \vec{\eta}_1$ And, finally, at the $\vec{\rho}_1$ input:

$$\vec{\tau}_s = \vec{\rho}_1 + \vec{\eta}_1 \qquad (1)$$

$$\vec{\tau}_s' = \vec{\rho}_2 + \vec{\eta}_2 - \vec{\rho}_1 \times \vec{\eta}_1 \qquad (2)$$

$$\vec{\tau}_s'' = \vec{\rho}_3 + \vec{\eta}_3 - \vec{\eta}_2 \times \vec{\eta}_1 - \vec{\rho}_2 \times \vec{\eta}_1 - 2\vec{\rho}_1 \times (\vec{\rho}_2 + \vec{\eta}_2) + (\vec{\rho}_1 \times)^2 \vec{\eta}_1 \qquad (3)$$

Equations (1–3) will be used in the following examples to determine the required values of the compensator elements $\vec{\eta}_1$, $\vec{\eta}_2$, and $\vec{\eta}_3$.

EXAMPLE 1

Compensating PMD Up to a Specified Order Using Fixed Differential Dispersion Elements One method of compensating first-order PMD that was proposed by T. Takahashi et al. [Electronics Letters, Vol. 30, pp. 348–350, 1994] and F. Roy et al. [Proceedings of Optical Fiber Communications Conference 1999, paper TuS4,Vol. 1, pp. 275–277] is to use a polarization controller (PC) and fixed differential group delay element (for example, a length of polarization-maintaining fiber) at the system output. By adjusting the PC, the first-order PMD vector of the entire system (the transmission link+compensator) can be forced to be aligned with the launch polarization to the transmission link. Therefore, the launch polarization is the Principal State of Polarization of the entire system (link+compensator). The operation of this compensator is well understood and has been tested in a number of laboratory experiments and field trials.

The present example uses the framework of the higher-power rotation elements (i.e. equations 1–3) and extends the idea of using fixed compensation elements to compensate higher-order PMD, as shown in FIG. 7. The compensator consists of fixed differential dispersion elements separated by polarization controllers. Basically, we want to force the launch state of polarization to be aligned with the axis $\hat{r}_n$ of the combined transmission link+PMD compensator for each order of PMD.

For example, from equation (1), we want the input polarization $\hat{s}_{in}$ to be aligned with $\vec{\tau}_s = \vec{\rho}_1 + \vec{\eta}_1$, which implies $$a \hat{s}_{in} = \vec{\tau}_s = \vec{\rho}_1 + \vec{\eta}_1 \qquad (4)$$

where a is a scalar constant. If $\vec{\rho}_1$ is known and the magnitude $|\vec{\eta}_1|$ fixed, the polarization controller can allow the direction of $\vec{\eta}_1$ to be adjusted to match equation (4).

Similarly from equation (2), we want $\hat{s}_{in}$ in to be aligned with $\vec{\tau}_s'$, implying $$b \hat{s}_{in} = \vec{\tau}_s' = \vec{\rho}_2 + \vec{\eta}_2 - \vec{\rho}_1 \times \vec{\eta}_1. \qquad (5)$$

where b is a scalar constant. Here, $\vec{\rho}_1$, $\vec{\rho}_2$, $\vec{\eta}_1$, and $|\vec{\eta}_2|$ are known (and fixed), while the direction of $\vec{\eta}_2$ can be adjusted to match equation (5).

And, finally, from equation (3), we want $\hat{s}_{in}$ to be aligned with $\vec{\tau}_s''$, implying $$c\hat{s}_{in} = \vec{\tau}_s'' = \vec{\rho}_3 + \vec{\eta}_3 - \vec{\eta}_2 \times \vec{\eta}_1 - \vec{\rho}_2 \times \vec{\eta}_1 - 2\vec{\rho}_1 \times (\vec{\rho}_2 + \vec{\eta}_2) + (\vec{\rho}_1 \times)^2 \vec{\eta}_1 \qquad (6)$$

where c is a scalar constant. Here, $\vec{\rho}_1$, $\vec{\rho}_2$, $\vec{\rho}_3$, $\vec{\eta}_1$, $\vec{\eta}_2$, and $|\vec{\eta}_3|$ are known (and fixed), while the angle of $\vec{\eta}_3$ can be adjusted to match equation (6).

Figure 9:
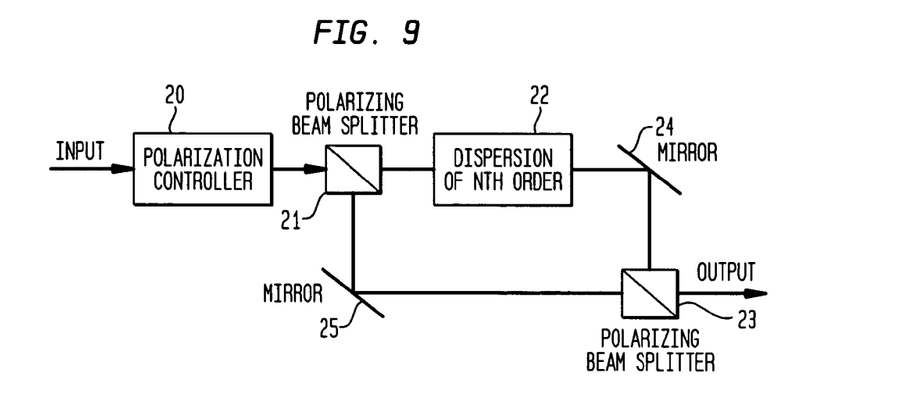

Note that equations (4) and (5) show that higher-orders of PMD do not enter into the conditions for lower-order PMD compensation. This method of setting up the compensator means that higher-order settings do not affect the lower-order settings done earlier, making the compensator easier to implement and control. This implies that in the actual implementation of the compensator, the algorithm to set the values of $\vec{\eta}_1$, $\vec{\eta}_2$, and $\vec{\eta}_3$ can simply do the adjustment for $\vec{\eta}_1$ first, followed by $\vec{\eta}_2$, and then $\vec{\eta}_3$. The algorithm should not need to jump back to adjust $\vec{\eta}_1$ before adjusting $\vec{\eta}_3$ (after adjusting $\vec{\eta}_1$ and $\vec{\eta}_2$), if the PMD vector information for the various orders is provided by the monitor directly. The basic implementation of one of these fixed differential dispersion elements is shown in FIG. 9.

Figure 10:
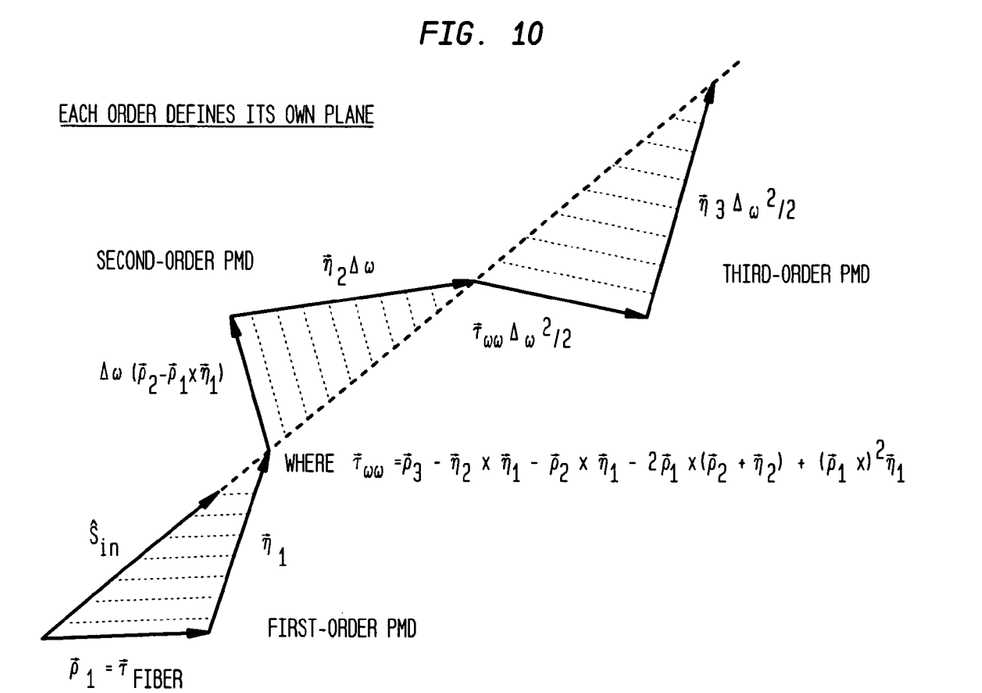

FIG. 10 shows a diagram of the vector relationships described by equations (4-6). Note that there is a plane defined for every order. Note also that for ease of operation, we should choose $|\vec{\eta}_1|>|\vec{\rho}_1|$ (i.e. the DGD of the first-order rotation element should be greater than the largest DGD we wish to compensate). Also, $|\vec{\eta}_2|>|\vec{\rho}_2-\vec{\rho}_1\times\vec{\eta}_1|$ (i.e. the differential dispersion of the second-order compensating element should be greater than the largest second-order PMD that we wish to compensate) and $$|\vec{\eta}_3|>|\vec{\rho}_3-\vec{\eta}_2\times\vec{\eta}_1-\vec{\rho}_2\times\vec{\eta}_1-2\vec{\rho}_1\times(\vec{\rho}_2+\vec{\eta}_2)+(\vec{\rho}_1\times)^2\vec{\eta}_1|,$$

(i.e. the differential dispersion slope of the third-order compensating element should be greater than the largest third-order PMD that we wish to compensate).

Note that the invention can be extended to compensate PMD of higher than third-order by adding elements having frequency rotations of fourth- and higher order (i.e. $\vec{\eta}_m$ where m≧4.)

EXAMPLE 2

Compensating PMD Up to a Specified Order Using Tunable Differential Dispersion Elements As an alternative embodiment of the fixed differential dispersion elements described in Example 1, the compensation components $\vec{\eta}_1$, $\vec{\eta}_2$, and $\vec{\eta}_3$ can be made fully tunable and be set to obey equations (4–6). In order to make $\vec{\eta}_1$, $\vec{\eta}_2$, and $\vec{\eta}_3$ fully tunable (where $\vec{\eta}_n=k_n\hat{r}_n$ and the frequency-dependent rotation angle is $\phi_n(\omega_0+\Delta\omega)=k_n\Delta\omega^n/n!$), both the rotation axis ($\hat{r}_n$) of the higher-order rotation elements and the magnitude ($k_n$) must be adjustable. This can be realized using polarization controllers between elements of adjustable differential dispersion of specified order. While this alternative embodiment will require more control signals for the compensator compared to the embodiment of Example 1, further optimization of the PMD compensation can be achieved. For example, fully tunable differential dispersion elements will enable minimization of undesired higher-order PMD produced by the PMD compensator.

For $\vec{\eta}_1$, standard differential delay elements can be used, such as an opto-mechanical delay line [F. Heismann et al., Proceedings of European Conference on Optical Communication 1998,Vol. 1, p. 529], nonlinearly chirped PM-fiber Bragg grating [S. Lee et al., Proceedings of Optical Fiber Communications Conference 1999, paper TuS3], or PM fiber sections with switchable half- and full-wave plates [D. Sobiski et al., Electronics Letters, Vol. 37, p. 46–48, 2001].

For $\vec{\eta}_2$, a tunable group-velocity dispersion element is used instead of the delay element. This tunable dispersion element could be a chirped fiber Bragg grating with thermal tuning of the grating [B. Eggleton et al., IEEE Photonics Technology Letters, Vol. 11, pg. 854–856, 1999] and an optical circulator. Other implementations include a virtual-imaged phase array, which has tunable dispersion [M. Shirasaki et al., Proceedings of European Conference on Optical Communication 2000, post-deadline paper 2.3], or tunable all-pass filters using ring resonators [C. Madsen et al., IEEE Photonics Technology Letters, Vol. 11, pg 1623–1625, 1999]. A further implementation could involve tunable (adjustable) higher-order-mode dispersion compensators, as proposed by S. Ramachandran et al. in Proceedings of European Conference on Optical Communication 2002, paper PD2.6.Note that care should be taken to eliminate any differential group delay from any of these elements.

For $\vec{\eta}_3$, tunable dispersion slope elements are required. These could be implemented in tunable Bragg gratings that are chirped to second order to produce dispersion slope. Any element with tunable dispersion slope can be used. Again, care should be taken to eliminate any differential group delay or differential dispersion from these elements.

Note again that the invention can be extended to compensate PMD of higher than third-order by adding elements having frequency rotations of fourth- and higher order (i.e. $\vec{\eta}_m$ where m≧4.)

It can now be seen that, in a first aspect, the invention includes an optical fiber transmission system comprising a source of light in a frequency range including $\omega_o$, an optical fiber transmission path for transmitting the light, the path subject to unwanted polarization mode dispersion (PMD), and a polarization mode dispersion compensator for reducing PMD. The compensator comprising a plurality of compensating components, each different compensating component structured and configured to compensate a successively higher order of PMD at $\omega_o$. For example, a first of the plurality of compensating components compensates for $\vec{\tau}(\omega_0)$, the PMD vector at $\omega_o$, and the second compensating component compensates for $\vec{\tau}_\omega(\omega_0)$, the slope of the PMD vector versus frequency at $\omega_o$. A third compensating component can compensate for $\vec{\tau}_{\omega\omega}(\omega_0)$, the rate at which the slope of the PMD vector versus frequency changes with frequency.

In another aspect, the invention also includes the above-described PMD compensator. In an advantageous embodiment, each of the components of the PMD compensator comprises a polarization beam splitter for splitting the polarization components of a light beam between two paths, a delay or dispersion element in one of the paths, and a polarization beam combiner to recombine the polarization components. As described above, the delay or dispersion elements may be fixed or tunable, resulting in compensation components that have fixed or tunable differential delay or dispersion.

Several monitoring techniques have been proposed for PMD compensators, providing different information about the PMD of the fiber or distortion of the signal due to PMD. Examples of monitors include RF spectral monitoring [Takahashi et al. 1994], RF power [H. Bulow et al., Proceedings of European Conference on Optical Communication 1999, Vol. 2, pp. 138–139], eye monitor [H. Bulow et al., Proceedings of European Conference on Optical Communication 2000,Vol. 3, pp. 209–210], and degree-of-polarization [Roy et al. 1999]. Depending on the information available from the receiver and/or PMD monitor at the PMD compensator output, the components (comprised of polarization controllers and fixed or tunable differential dispersion elements) of the afore-mentioned PMD compensator can be adjusted to mitigate the effects of the different orders of PMD or to simply obtain the optimum performance of the transmitted signal (e.g. lowest bit-error-rate). The latter may require dithering of the polarization controllers or tunable dispersion elements. This strategy has been applied to other types of multi-stage PMD compensators, as described in F. Buchali et al., Proceedings of Optical Fiber Communications Conference 2003,Vol. 1, pp. 262–264, and could be an advantageous strategy for the above-described PMD compensator.

It is understood that the above-described embodiments are illustrative of only a few of the many possible specific embodiments, which can represent applications of the invention. For example, other orderings of the compensating components can be used, besides those described above, and may be found to be advantageous depending upon the application. Numerous and varied other arrangements can be made by those skilled in the art without departing from the spirit and scope of the invention.

What is claimed is:

1. A polarization mode dispersion compensator for reducing polarization mode dispersion (PMD) of transmitted light in a frequency range including $\omega_0$ comprising a plurality of PMD compensating components in series, the respective compensating components configured to compensate respective orders of dispersion of at least three successively higher order terms of the PMD vector expressed as a Taylor series expansion with respect to $\omega_0$, wherein the said PMD compensating components each comprise a polarization beam splitter for splitting the polarization components of a light beam between two paths, the two paths having different dispersions for compensating a respective order, a polarization beam combiner to recombine the polarization components; and a polarization controller to rotate the polarization of the beam prior to the polarization beam splitter.

2. The polarization mode dispersion compensator of claim 1 wherein, for at least one PMD compensating componet, one path after the polarization beam splitter has an element with dispersion of the repecitve order, while the other path has no dispersion element.

3. The polarization mode dispersion compensator of claim 1 wherein, for at least one PMD compensating component, the paths after the polarization beam splitter each have elements with dispersion of the repective order, and the dispersion values are different.

4. The polarization mode dispersion compensator of claim 1 wherein, for at least one PMD compensating component, the paths after the polarization beam splitter each have elements with dispersion of the respective order, where the dispersions are of equal magnitude but opposite sign.

5. The polarization mode dispersion compensator of claim 2 wherein the element with dispersion of the respective order has tunable dispersion.

6. The polarization mode dispersion compensator dispersion compensator of claim 2 wherein the element with dispersion of the respective order has fixed dispersion.

7. The polarization mode dispersion compensator of claim 3 wherein the elements with dispersion of the respective order have tunable dispersion.

8. The polarization mode dispersion compensator of claim 3 wherein the elements with dispersion of the respective order have fixed dispersion.

9. The polarization mode dispersion compensator of claim 4 wherein the elements with dispersion of the respective order have tunable dispersion.

10. The polarization mode dispersion compensator of claim 4 wherein the elements with dispersion of the respective order have fixed dispersion.

11. The polarization mode dispersion compensator of claim 1 further comprising one or more additional PMD compensating components to compensate one or more terms of the PMD vector higher in order than the third term.

* * * * *